United States Patent
Mackey

(10) Patent No.: US 9,316,215 B2
(45) Date of Patent: Apr. 19, 2016

(54) MULTIPLE PUMP SYSTEM

(75) Inventor: Michael Mackey, San Diego, CA (US)

(73) Assignee: GP STRATEGIES CORPORATION, Elkridge, MD (US)

(*) Notice: Subject to any disclaimer, the term of this patent is extended or adjusted under 35 U.S.C. 154(b) by 698 days.

(21) Appl. No.: 13/564,400

(22) Filed: Aug. 1, 2012

(65) Prior Publication Data

US 2014/0034162 A1    Feb. 6, 2014

(51) Int. Cl.

| | |
|---|---|
| *E03B 5/00* | (2006.01) |
| *F04B 23/02* | (2006.01) |
| *F04D 13/12* | (2006.01) |
| *F04B 23/04* | (2006.01) |
| *F04D 7/02* | (2006.01) |
| *F04D 13/14* | (2006.01) |
| *F04D 29/58* | (2006.01) |

(52) U.S. Cl.
CPC ............... *F04B 23/021* (2013.01); *F04B 23/04* (2013.01); *F04D 7/02* (2013.01); *F04D 13/12* (2013.01); *F04D 13/14* (2013.01); *F04D 29/5893* (2013.01); *Y10T 137/86131* (2015.04)

(58) Field of Classification Search
CPC ...... F17C 5/02; F17C 5/06; F17C 2223/0161; F04B 23/04; F04B 23/021
USPC ................ 137/565.29, 565.33; 62/48.1, 50.1, 62/50.6, 50.7
See application file for complete search history.

(56) References Cited

U.S. PATENT DOCUMENTS

| | | | |
|---|---|---|---|
| 5,315,831 A | 5/1994 | Goode et al. | |
| 5,678,411 A | 10/1997 | Matsumura et al. | |
| 6,244,053 B1 | 6/2001 | Gulati et al. | |
| 6,334,312 B1 | 1/2002 | Mack et al. | |
| 6,371,153 B1 * | 4/2002 | Fischerkeller et al. | 137/265 |
| 6,898,940 B2 | 5/2005 | Gram et al. | |
| 7,069,730 B2 | 7/2006 | Emmer et al. | |
| 7,114,342 B2 | 10/2006 | Oldham et al. | |
| 7,222,647 B2 | 5/2007 | Bingham et al. | |
| 7,284,575 B2 | 10/2007 | Gram et al. | |
| 7,493,778 B2 | 2/2009 | Engdahl | |
| 2002/0157402 A1 | 10/2002 | Drube et al. | |
| 2006/0120904 A1 | 6/2006 | Haesloop | |

(Continued)

FOREIGN PATENT DOCUMENTS

WO    WO 84/01002    3/1984

OTHER PUBLICATIONS

Patent Cooperative Treaty (PCT) International Search Report and Written Opinion of the International Searching Authority issued on Dec. 9, 2013 in corresponding International Application No. PCT/US2013/051645, 8 pages.

*Primary Examiner* — John K Fristoe, Jr.
*Assistant Examiner* — Reinaldo Sanchez-Medina
(74) *Attorney, Agent, or Firm* — Finnegan, Henderson, Farabow, Garrett & Dunner LLP

(57) ABSTRACT

A multiple pump system is disclosed. The multiple pump system may include a fluid tank and a multiple pump vessel connected to the fluid tank. The multiple pump vessel may include at least one first pump and at least one second pump located therein. In addition, the at least one first pump may be configured to dispense a fluid from the fluid tank at a first pressure, and the at least one second pump may be configured to dispense the fluid from the fluid tank at a second pressure. The first pressure may be different from the second pressure, such that the at least one first pump may be configured to dispense liquefied natural gas, and the at least one second pump may be configured to dispense compressed natural gas.

24 Claims, 2 Drawing Sheets

(56) References Cited

U.S. PATENT DOCUMENTS

| | | |
|---|---|---|
| 2007/0108096 A1 | 5/2007 | Egan et al. |
| 2008/0302111 A1 | 12/2008 | Batenburg et al. |
| 2009/0229276 A1 | 9/2009 | Rieder et al. |
| 2011/0056699 A1 | 3/2011 | Bjoroy et al. |

* cited by examiner

MULTIPLE PUMP SYSTEM

TECHNICAL FIELD

Embodiments of the present disclosure generally relate to pump systems, and more particularly, fluid pump systems that include multiple pumps in a single vessel for dispensing liquids, such as cryogenic liquids and fuels (e.g., liquefied natural gas).

BACKGROUND

Generally, natural gas (NG) presents a viable fuel alternative to fuels, for example, gasoline and diesel fuel. Specifically, NG may be utilized as an alternative fuel to power vehicles and machinery. NG can be liquefied, becoming known as liquefied natural gas (LNG), for transporting to a usage site. At a usage site, cryogenic pumps are usually used to pump LNG to a pressure of approximately 230 psig for dispensing LNG into vehicles and higher pressure cryogenic pumps are used to pressurize LNG to approximately 4000 psig, which is then vaporized to make compressed natural gas (CNG) to dispense CNG into vehicles. The LNG to CNG system is typically referred to as liquefied-to-compressed natural gas (LCNG). A primary concern, therefore, is the ability to quickly and efficiently pump LNG and/or LCNG to the required pressures for dispensing.

Quickly and efficiently pumping LNG and LCNG for dispensing may require multiple cryogenic pumps at a usage site. Typically, cryogenic pumps for LNG and LONG dispensing are individually located in vacuum insulated vessels. The location of the pumps in vacuum insulated vessels allows for maintaining each pump at an optimum temperature for pumping LNG. That is, pumping LNG or other cryogenic fluids may require the use of pumps at a low temperature to prevent cavitation. When pumps are in contact with ambient temperatures, they may require a time-consuming cooling process prior to starting. When cryogenic pumps are located within vacuum-insulated vessels containing the cryogenic fluid, they do not need to go through the lengthy cooling process, which enables quick-start of the cryogenic pumps for quick LNG and LCNG dispensing operations.

Each insulated vessel may include piping, valves, instrumentation, and vents. Accordingly, with the addition of each cryogenic pump at a usage site comes greater reliability concerns and increased monetary costs associated with each individual insulated vessel and associated piping, valves, instrumentation, and vents. There exists a need, therefore, for a multiple pump system that includes multiple pumps in a single insulated vessel in order to reduce costs associated with individual insulated vessels, while improving reliability and efficiency of pumping LNG and/or LCNG for dispensing at usage sites.

SUMMARY OF THE INVENTION

A multiple pump system is disclosed. The multiple pump system may include a multiple pump vessel to house pumps, for instance, cryogenic pumps. The multiple pump vessel may house at least one first pump and at least one second pump. For instance, the at least one first pump may include zero, one or more low pressure cryogenic pump(s); and the at least one second pump may include zero, one or more high pressure cryogenic pump(s). In some embodiments, the multiple pump system may have all low pressure cryogenic pumps, or all high pressure cryogenic pumps. Cryogenic fluid may be gravity fed to the multiple pump vessel from one or more larger cryogenic storage vessels. The at least one first pump and the at least one second pump may be at least partially submerged within a fluid, for instance, a cryogenic fluid, in the multiple pump vessel, and the at least one first pump may be configured to pump a fluid at a different pressure than the at least one second pump.

In various embodiments, the multiple pump system may include one or more of the following additional features; the multiple pump system may include at least one first power source that may be configured to provide power to the at least one first pump and at least one second power source that may be configured to provide power to the at least one second pump; the at least one first power source may be configured to operate the at least one first pump at a first power level, the at least one second power source may be configured to operate the at least one second pump at a second power level, and the first power level may be different from the second power level; the at least one first power source may be located within or exterior to the multiple pump vessel; and the at least one second power source may be located within or exterior to the multiple pump vessel; the at least one first and/or second power source may be an electric motor, a pneumatic motor or hydraulic motor; the fluid may be a cryogenic fluid in the form of liquefied natural gas, and the at least one first pump and the at least one second pump may be configured to pump the cryogenic fluid such that the at least one first pump may be configured to pump LNG for LNG dispensing and the at least one second pump may be configured to pump LCNG for CNG dispensing; the at least one first pump may include a plurality of first pumps, and the at least one second pump may include a plurality of at least one second pumps; the at least one first pump and the at least one second pump may be partially or fully submerged within the fluid in the multiple pump vessel; and there may be a first discharge line extending from the at least one first pump and a second discharge line extending from the at least one second pump, wherein the first and second discharge lines may be configured to dispense the fluid at the first and second pressures, respectively.

A further multiple pump system is disclosed. The multiple pump system may include a fluid tank. A first insulated vessel may be connected to the fluid tank, and the first insulated vessel may include a plurality of first pumps located therein. A second insulated vessel may be connected to at least one of the fluid tank and the first insulated vessel, and the second insulated vessel may include a plurality of second pumps located therein. The plurality of first pumps may be configured to dispense a fluid from the fluid tank at a first pressure, the plurality of second pumps may be configured to dispense the fluid from the fluid tank or a first discharge line at a second pressure, and the first pressure may be different from the second pressure. In some embodiments, the first pressure may be a low pressure, and the second pressure may be a high pressure, or vice versa. In other embodiments, the first and second pressures may be two different high pressures, or the first and second pressures may be two different low pressures. In addition, the fluid may be a liquefied natural gas; and the plurality of first pumps may be configured to dispense liquefied natural gas, and the plurality of second pumps may be configured to dispense compressed natural gas.

Additional objects and advantages of the disclosure will be set forth in part in the description that follows, and in part will be obvious from the description, or may be learned by practice of the disclosed embodiments. The objects and advantages of the disclosure will be realized and attained by means of the elements and combinations particularly pointed out in the appended claims.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate several embodiments of the disclosure and, together with the description, serve to explain the principles of the embodiments disclosed herein.

DESCRIPTION OF THE EMBODIMENTS

Reference will now be made in detail to exemplary embodiments of the present disclosure, examples of which are illustrated in the accompanying drawings. Wherever possible, the same reference numbers will be used throughout the drawings to refer to the same or like parts.

Embodiments of the present disclosure generally relate to systems for pumping fluid. More particularly, embodiments of the present disclosure relate to multiple pump systems for pumping fluids, such as fuels, including, but not limited to, cryogenic fluids. Cryogenic fluids may include, but are not limited to, natural gas, oxygen, argon, hydrogen, and nitrogen, each in either liquid or gas form. While the present disclosure may refer to LNG as the fluid to be employed, it should be appreciated that any suitable fluid may be used that may be configured to be pumped by embodiments of the present disclosure. The pumping system can be configured to deliver any fluid to a use device, for instance, a vehicle, a ship (not shown), or the like, for fueling. Moreover, the systems and devices described herein can perform non-fueling applications, such as the delivery of fluids to use devices for industrial or non-transportation-related purposes. In addition to vehicles, any other use device may receive the fluid dispensed by the pumping system.

Figure 1:
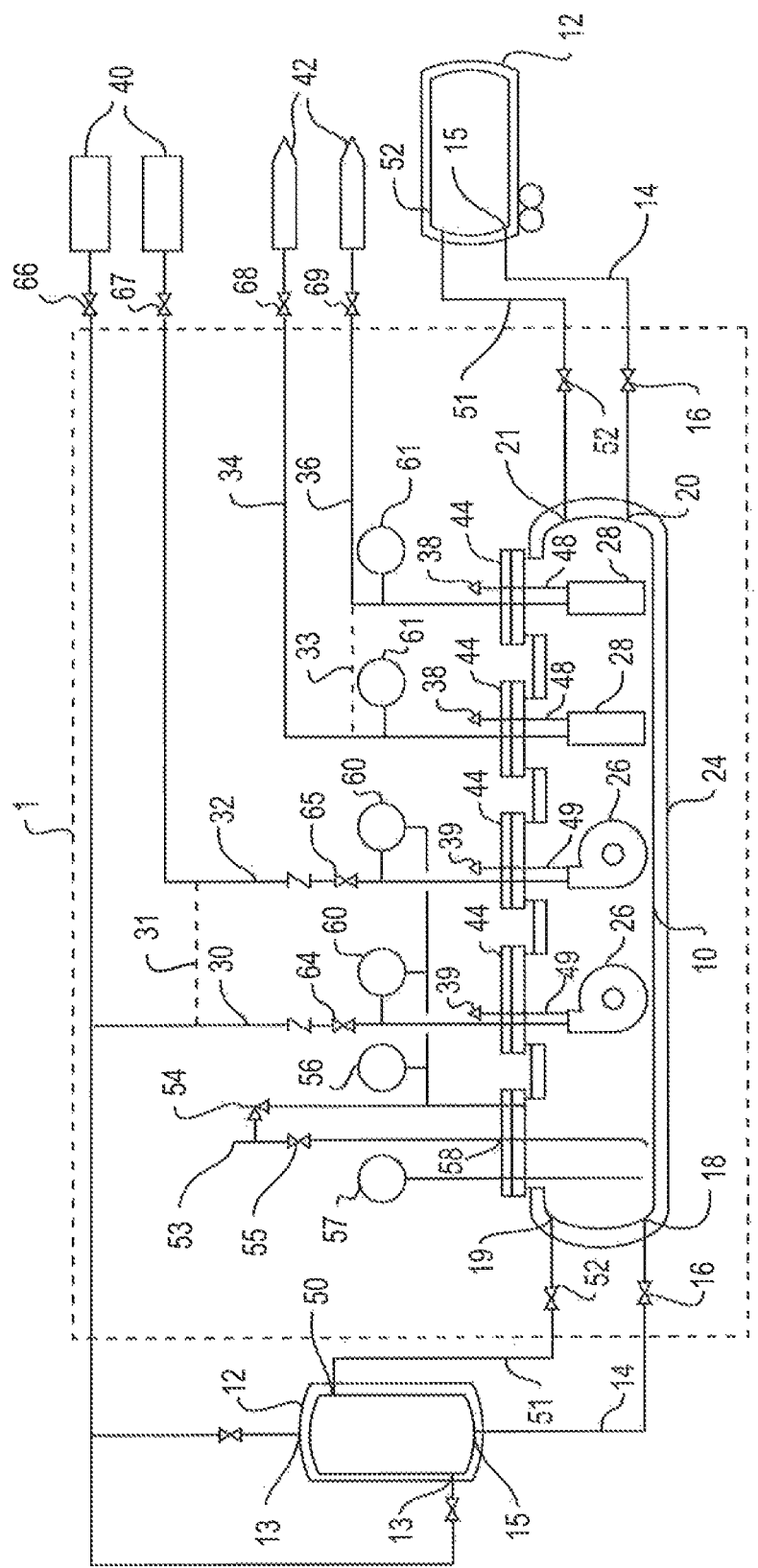
FIG. 1 illustrates a multiple pump system, according to a first embodiment of the present disclosure.

Although FIG. 1 depicts a fluid dispensing system as including a number of various components, those of ordinary skill in the art will readily recognize that one or more of the depicted components may be replaced and/or eliminated without altering the principles of the present disclosure.

FIG. 1 illustrates a multiple pump system 1, according to a first embodiment of the present disclosure. Multiple pump system 1 may include one or more fluid tanks 12. Fluid tank 12 may include an insulated container for storing a large volume of fluid that may be pumped via multiple pump system 1. As previously discussed, embodiments of the present disclosure may be configured to pump any suitable fluid, such as, for example, cryogenic fuels. Fluid tank 12 may accordingly be configured to insulate any suitable fluid that may be configured to be pumped by multiple pump system 1. Suitable fluids may include, but are not limited to, liquid oxygen, liquid hydrogen, liquid argon, and liquid nitrogen. In one embodiment, for example, fluid tank 12 may be filled with LNG.

As illustrated in FIG. 1, fluid tank 12 may be a single fluid storage unit or one of multiple operably connected fluid tanks 12 configured to store fluid to be pumped by multiple pump system 1. Fluid tank 12 may be a stationary storage unit that may be configured to remain at a single fluid pumping site. Alternatively, fluid tank 12 may be part of a movable trailer, such that fluid tank 12 may be transported to various fluid pumping sites.

Fluid tank 12 may be vacuum insulated, foam insulated, or include any other type of insulation suitable for storage of the fluid. In addition, fluid tank 12 may be any suitable shape, including but not limited to, cylindrical, barrel-shaped, rectangular, and trapezoidal, and may be oriented in a horizontal or vertical direction.

Fluid tank 12 may additionally include one or more vent stacks (not shown). The vent stacks may be configured to reduce pressure within fluid tank 12 by selectively allowing vapor pressure to be released from fluid tank 12. One or more valves may be operatively coupled to the one or more vent stacks. Each valve may be capable of at least two configurations. A first configuration may be a closed configuration such that vapor may substantially remain in fluid tank 12, and a second configuration may be an open configuration and may allow vapor to flow from fluid tank 12, through the valves, and out the vent stacks. The one or more valves may be configured to be transitioned between the first, closed configuration and the second, open configuration manually or via an automated controls.

Fluid tank 12 may additionally include one or more pressure sensors (not shown) and/or one or more indicators, such as a level indicator (not shown). The one or more indicators may be any suitable audio or visual indicator. Moreover, the one or more pressure sensors may be configured to sense vapor pressure within fluid tank 12. The one or more pressure sensors may further be configured to communicate (in a wired or wireless connection) with the one or ore indicators when the vapor pressure is above a predetermined threshold, which may thereby indicate the need to open one or more valves and release pressure through the one or more vent stacks.

Fluid tank 12 may further include one or more inlets 13 that may be configured to allow fluid tank 12 to be filled with a quantity of fluid. The inlets 13 may be configured to be positioned anywhere on fluid tank 12 (e.g., an upper or lower region). Inlets 13 may additionally be configured with manual and automatic valves for opening and closing inlets 13. Alternatively, maintenance devices and/or measuring devices may be configured to be integral with fluid tank 12. The maintenance devices may include any suitable means for maintaining fluid tank 12 including, but not limited to, de-icers, means for removing condensation from fluid tank 12 from any inlets, outlets, conduits, valves, or nozzles, and/or security devices to prevent tampering therewith.

In addition, inlets 13 may be configured for inserting or removing measuring devices from fluid tank 12. The measuring devices may be configured to measure one or more properties of the fluid within fluid tank 12. In one embodiment, for example, measuring devices may be operatively coupled to a display, an automated control, and/or any other suitable means for communicating measurement data to an external reader. Such measuring devices may include, but are not limited to, sensors for detecting pressure, temperature, fluid level, motion, and indicators for determining whether maintenance may be necessary. The measuring devices may be configured to signal to a system operator in an audio and/or visual manner when certain conditions are present and/or possible with regards to fluid tank 12. Fluid tank 12 may further be operatively coupled to one or more outlets 15. The one or more outlets 15 may be configured to remove a quantity of fluid from fluid tank 12, and may be positioned anywhere on fluid tank 12 (e.g., an upper region, a lower region, and/or a side region). The one or more outlets 15 may also include one or more nozzles or vortex breakers (not shown), for instance, to facilitate the transfer of fluid out of fluid tank 12. One or more of these outlets 15 may include a drain system (not shown). The drain system may include an emergency drain system, whereby a device operator and/or an automated system may be configured to drain fluid tank 12 in response to certain conditions. In addition, the one or more outlets 15 may be configured to drain fluid tank 12 for maintenance or repairs.

The one or more outlets 15 may further be in operative communication with one or more conduits 14. Conduit 14 may be any suitable hollow structure configured to allow fluid to flow therethrough from an interior region of fluid tank 12 to an interior region of a multiple pump vessel 10. Accordingly, conduit 14 may include, but is not limited to, a pipe or a hose, for example. Conduit 14 may further include one or more valves 16. Valve 16 may be configured to allow or substantially prevent communication between the interior region of fluid tank 12 and the interior region of multiple pump vessel 10. Valve 16 may therefore be configured to be transitioned manually and/or automatically between a first, closed configuration and a second, open configuration.

Fluid tank 12 may further be operatively coupled to one or more vapor nozzles 50. One or more vapor nozzles 50 may be positioned anywhere on fluid tank 12, for instance, an upper region, a lower region, or a central region. One or more vapor nozzles 50 may also include one or more deflector plates (not shown) to facilitate the transfer of vapor into and out of out of fluid tank 12. Outlets 19, 21 may be associated with multiple pump vessel 10 and may be configured to facilitate the transfer for vapor out of multiple pump vessel 10.

One or more vapor nozzles 50 and outlets 19, 21 may further be in operative communication with one or more conduits 51. Conduit 51 may be any suitable hollow structure configured to allow fluid to flow between the interior region of fluid tank 12 and the interior region of multiple pump vessel 10. Accordingly, conduit 51 may include, but is not limited to, a pipe or a hose, for instance. Conduit 51 may further include one or more valves 52. Valve 52 may be configured to allow or substantially prevent communication between the interior region of fluid tank 12 and the interior region of multiple pump vessel 10. Valve 52 may therefore be configured to be transitioned manually and/or automatically between a first, closed configuration and a second, open configuration.

The fluid in fluid tank 12 may be configured to flow into conduit 14 via any means known to those skilled in the art. As illustrated in FIG. 1, in one embodiment, fluid may flow into conduit 14 via natural gravity flow by allowing pressure in an upper region of fluid tank 12 to substantially equal the pressure in an upper region of multiple pump vessel 10 via conduit 51 and valve 52. Alternatively, or in addition, fluid may be dispersed into conduit 14 via one or more pumps (not shown).

As discussed above, conduit 14 and conduit 51 may be in operative communication with multiple pump vessel 10. Multiple pump vessel 10 may include an insulated vessel 24, such as a vacuum insulated vessel, having, for instance, foam insulation or any other suitable type of insulation device.

FIG. 1 illustrates that multiple pump system 1 may include a single multiple pump vessel 10. In alternative embodiments, however, multiple pump system 1 may include any desired number of multiple pump vessels 10, so long as each multiple pump vessel 10 may be directly and/or indirectly connected to fluid tank 12 in order to receive fluid from fluid tank 12. For example, in one embodiment, multiple pump system 1 may include two multiple pump vessels 10. Each multiple pump vessel 10 may be connected to fluid tank 12 via a respective conduit 14 having a valve 16. In addition, multiple pump vessels 10 may be connected to one another via a conduit 14 having a valve 16. Moreover, multiple pump vessel 10 may be a stationary storage unit that may be configured to remain at a single fluid pumping site. Alternatively, multiple pump vessel 10 may be part of a movable trailer, such that multiple pump vessel 10 may be configured to be transported to multiple fluid pumping sites.

Multiple pump vessel 10 and/or insulated vessel 24 may be any suitable insulated container configured for storing and dispensing a volume of fluid from fluid tank 12. Accordingly, multiple pump vessel 10 and/or insulated vessel 24 may include, but are not limited to, a vacuum vessel, vacuum jacket, or any other type of insulated container configuration. In addition, multiple pump vessel 10 and/or insulated vessel 24 may be any suitable shape, including, but not limited to, cylindrical, barrel-shaped, rectangular, and trapezoidal, and may be oriented in a horizontal or vertical direction. Multiple pump vessel 10 and/or insulated vessel 24 may further be of any suitable size. In one embodiment, for example, multiple pump vessel 10 and/or insulated vessel 24 may be configured to contain a maximum volume of fluid that is less than a maximum volume of fluid stored in fluid tank 12. Similar to fluid tank 12, multiple pump vessel 10 and/or insulated vessel 24 may be configured to insulate any suitable fluid that may be configured to be pumped by multiple pump system 1. Suitable fluids may include, but are not limited to, LNG, liquid oxygen, liquid hydrogen, liquid argon, and liquid nitrogen. In one embodiment, for example, multiple pump vessel 10 and/or insulated vessel 24 may be configured to be filled with and insulate LNG.

Embodiments of multiple pump vessel 10 may further include one or more features that are similar to features contained in and/or on fluid tank 12. For example, multiple pump vessel 10 may include one or more vent stacks 53 configured to reduce pressure within multiple pump vessel 10 by selectively allowing vapor pressure to be released from multiple pump vessel 10. Accordingly, multiple pump vessel 10 may further include one or more vent valves 54 and one of more drain valves 55 operatively coupled to one or more vent stacks 53. As previously discussed in relation to fluid tank 12, each valve 54, 55 may be capable of at least two configurations, including, but not limited to, a closed configuration and an open configuration; and the one or more valves may be configured to be transitioned between the at least two configurations via manual and/or automated controls.

Multiple pump vessel 10 may additionally include one or more pressure sensors 56 and/or one or more audio and/or visual indicators (not shown). One or more pressure sensors 56 may be configured to sense vapor pressure within multiple pump vessel 10 and may be configured to communicate with the one or more indicators when the vapor pressure is above a predetermined threshold, which may thereby indicate the need to open one or more vent valves 54 and release pressure through one or more vent stacks 53. Moreover, additional measuring devices may be configured to measure one or more properties of the fluid within multiple pump vessel 10. In one embodiment, for example, measuring devices may be operatively coupled to a display, an automated control, and/or any other suitable means for communicating measurement data to an external reader.

Multiple pump vessel 10 may additionally include one or more temperature sensors 57 and/or one or more audio and/or visual indicators (not shown). One or more pressure temperature sensors 57 may be configured to measure liquid temperature within multiple pump vessel 10 and may be configured to communicate with the one or more indicators when the temperature is below a predetermined threshold to indicate that one or more of pumps 26, 28 are at the required temperature for starting.

Additional measuring devices may include, but are not limited to, sensors for detecting fluid level, motion, and indicators for determining whether maintenance may be necessary. Similar to measuring devices that may be configured to be associated with fluid tank 12, the measuring devices included in and/or on multiple pump vessel 10 may be configured to signal to a system operator in an audio and/or visual manner when certain conditions are present and/or possible with regards to multiple pump vessel 10

FIG. 1 further illustrates that multiple pump vessel 10 may include one or more inlets 18, 20 configured to be positioned anywhere on multiple pump vessel 10 (e.g., upper region, lower region, and/or side region). Inlets 18, 20 may be configured to allow multiple pump vessel 10 to be filled with a quantity of fluid from fluid tank 12. In addition, inlets 18, 20 may be configured to allow for insertion and/or removal of maintenance and/or measuring devices. In an alternative embodiment, however, maintenance devices and/or measuring devices may be configured to be integral with multiple pump vessel 10. As previously discussed, the maintenance devices may include any suitable means for maintaining multiple pump vessel 10 including, but not limited to, de-icers, means for removing condensation from multiple pump vessel 10, and/or security devices to prevent tampering therewith.

Moreover, the measuring devices may be configured to measure one or more properties of the fluid within multiple pump vessel 10. In one embodiment, for example, measuring devices may be operatively coupled to a display, an automated control, and/or any other suitable means for communicating measurement data to an external reader. Such measuring devices may include, but are not limited to, sensors for detecting pressure, temperature, fluid level, motion, and indicators for determining whether maintenance may be necessary. Similar to measuring devices that may be configured to be associated with fluid tank 12, the measuring devices included in and/or on multiple pump vessel 10 may be configured to signal to a system operator in an audio and/or visual manner when certain conditions are present and/or possible with regards to multiple pump vessel 10.

In addition to one or more inlets 18, 20, and one of more outlets 19, 21, multiple pump vessel 10 may include one or more outlets 58 configured to be positioned anywhere on multiple pump vessel 10 (e.g., an upper region, a lower region, and/or a side region). One or more outlets 58 may be configured to remove a quantity of fluid from multiple pump vessel 10. Accordingly, similar to fluid tank 12, the one or more outlets 58 may include one or more nozzles or pumps (not shown) to facilitate the transfer of fluid out of multiple pump vessel 10. In addition, or alternatively, one or more outlets 58 may include a drain valve 55 for draining the fluid from multiple pump vessel 10 in order to perform maintenance and/or repairs. The drain system may include an emergency drain system, whereby a device operator and/or an automated system may be configured to drain the fluid in multiple pump vessel 10 in response to certain sensed and/or measured conditions.

As alluded to above, multiple pump vessel 10 may also include at least one first pump 26 and at least one second pump 28 located therein. The at least one first pump 26 may include a plurality of first pumps 26, and the at least one second pump 28 may include a plurality of second pumps 28. As illustrated in FIG. 1, the plurality of first pumps 26 may include two first pumps 26, and the plurality of second pumps 28 may include two second pumps 26. In other embodiments, however, there may be any desired number or combinations of first and second pumps 26, 28, so long as at least one first pump 26 and at least one second pump 28 are located within insulated vessel 24. In some embodiments, first pump 26 may be the same type of pump as second pump 28. First pump(s) 26 and second pump(s) 28 may include any number of high pressure and/or low pressure pumps. For instance, referring to FIG. 1, two first pumps 26 may include two low pressure pumps, and two second pumps 28 may include two high pressure pumps. In other embodiments, multiple pump vessel 10 may include no low pressure pumps or may include no high pressure pumps. Multiple pump vessel 10 may include any suitable number and configuration of low pressure and/or high pressure pumps.

The at least one first pump 26 and the at least one second pump 28 may be any suitable pumps known to those skilled in the art. Suitable pumps may include, but are not limited to, gear pumps, plunger pumps, piston pumps, centrifugal pumps, or any other positive displacement pump known to those skilled in the art. In the embodiment of FIG. 1, for example, the at least one first pump 26 may be a centrifugal pump and the at least one second pump 28 may be a piston pump.

Each of the at least one first pump 26 and the at least one second pump 28 may be configured to dispense fluid from within multiple pump vessel 10. In one embodiment, for example, when fluid from fluid tank 12 is located within multiple pump vessel 10, the at least one first pump 26 and the at least one second pump 28 may be configured to be at least partially submerged within the fluid in multiple pump vessel 10. In alternative embodiments, the at least one first pump 26 and the at least one second pump 28 may be fully submerged within the fluid in multiple pump vessel 10; and in further embodiments, the at least one first pump 26 and the at least one second pump 28 may not be submerged within the fluid in multiple pump vessel 10.

In addition, the at least one first pump 26 may be configured to dispense the fluid at a first pressure, and the at least one second pump 28 may be configured to dispense the fluid at a second pressure. The first pressure and the second pressure may be different from one another. For example, in one embodiment, the first pressure may be in a range of about 150 to 250 psi, whereas the second pressure may be in a range of about 4000 to 5000 psi. Accordingly, the at least one first pump 26 may each include at least one pressure sensor 60 configured to sense the pressure of the pumped fluid or the differential pressure across the at least one first pump 26. The at least one second pump 28 may each include at least one pressure sensor 61 configured to sense the pressure of the pumped fluid or the differential pressure across the at least one second pump 28. The pressure sensors may additionally be in wired or wireless communication with at least one audio and/or visual indicator, which may be configured to communicate pressure readings to a device operator. In one embodiment, for example, the communication may indicate whether the pressure of the pumped fluid is within a predetermined pressure range, which may thereby indicate whether adjustments and/or repairs need to be made to the multiple pump system in order to pump the fluid at the desired pressure from each of the at least one first and second pumps 26, 28.

The difference in dispensed fluid pressure between the at least one first pump 26 and the at least one second pump 28 may enable each of the first and second pumps 26, 28 to dispense the fluid in different forms and/or states. For example, in the embodiment where the fluid is LNG, the at least one first pump 26 may be configured to dispense LNG in the form of LNG. The higher dispensing pressure of the at least one second pump 28, however, may enable dispensing of LNG in the form of LCNG.

Each of the at least one first pump 26 and the at least one second pump 28 may further include a respective power source 39, 38. That is, the at least one first pump 26 may be connected to at least one first power source 39 configured to drive the at least one first pump 26, and the at least one second pump 28 may be connected to at least one second power source 38 configured to drive the at least one second pump 28. In alternative embodiments, however, a single power source may be connected to multiple first and/or second pumps 26, 28. For example, in one embodiment, a second power source 38 may be connected to a plurality of second pumps 28. The at least one first and second power sources 39, 38 may be any suitable power sources known to those skilled in the art including, but not limited to, electric, pneumatic, and hydraulic motors.

The at least one first power source 39 and the at least one second power source 38 may further be configured to provide the same or different power levels to the at least one first and second pumps 26, 28, respectively. In one embodiment, each of the first and second power sources 39, 38 may be configured to provide different levels of power to the respective first and second pumps 26, 28 such that first and second pumps 26, 28 may be configured to dispense the fluid at the previously discussed different pressure levels. For example, the at least one first power source 39 may be configured to operate the at least one first pump 26 at a power level in the range of about 20-30 hp. The at least one second power source 38, however, may be configured to operate the at least one second pump 28 at a power level in the range of about 30-200 hp. The at least one second power source 38 may further be configured to enable the at least one second pump 28 to start and stop based on dispensing demand, while reducing and/or substantially avoiding an inrush current. Accordingly, in the embodiment of FIG. 1, the at least one first power source 39 may include an electric motor, and the at least one second power source 38 may include a hydraulic motor.

The at least one first power source 39 and the at least one second power source 38 may additionally include measurement devices configured to measure the output power level of each of the first and second power sources 39, 38. Similar to the pressure sensors 60, 61 associated with the first and second pumps 26, 28, the measurement devices may be in wired or wireless communication with at least one audio and/or visual indicator for indicating the power level being output by each of the first and second power sources 39, 38 to the respective first and second pumps 26, 28.

Moreover, the at least one first power source 39 and the at least one second power source 38 may be located within multiple pump vessel 10 or exterior to multiple pump vessel 10. That is, each of the first and second power sources 39, 38 may be located within multiple pump vessel 10, or each of the first and second power sources 39, 38 may be located exterior to multiple pump vessel 10. Alternatively, the at least one first power source 39 may be located within multiple pump vessel 10, and the at least one second power source 38 may be located exterior to multiple pump vessel 10 and connected to the at least one second pump 28 via any suitable power line or power shaft 48 known to those skilled in the art.

FIG. 1 further illustrates that the first and second pumps 26, 28 are each connected to a respective discharge line 30, 32, 34, 36. Discharge lines 30, 32, 34, 36 may be any hollow structure configured to transfer pumped fluid. Accordingly, discharge lines 30, 32, 34, 36 may include, but are not limited to, a pipe and a hose. In addition, discharge lines 30, 32, 34, 36 may include a first end configured to be connected to a respective pump 26, 28 and a second end configured to extend to a region exterior multiple pump vessel 10 and operatively connect to a distribution location 40, 42.

Discharge lines 30, 32, 34, 36 may each include a portion between the first and second ends that extends through a respective opening 44 in multiple pump vessel 10. Each opening 44 may additionally correspond to a respective one of the at least first pump 26 and the at least one second pump 26. Opening 44 may be flush against an outer surface of insulated vessel 24. Alternatively, as illustrated in FIG. 1, opening 44 may include a hollow structure extending from an outer surface of insulated vessel 24 to multiple pump vessel 10. The hollow structure of opening 44 may be integral with or removably attached to insulated vessel 24. Each opening 44 may further include any suitable size, shape, and/or configuration such that it may enable insertion and removal of a respective at least one first pump 26 and at least one second pump 28 therethrough.

The embodiment of FIG. 1 illustrates that each of first and second pumps 26, 28 includes a single respective discharge line 30, 32, 34, 36. In alternative embodiments, however, each of first and second pumps 26, 28 may be connected to any desired number of discharge lines. Each discharge line 30, 32 may be connected via line 31 to provide a common discharge. In one embodiment, discharge lines 30, 31, and 32 may be low pressure discharge lines, for example. Each discharge line 34, 36 may be connected via line 33 to provide a common discharge. In one embodiment, discharge lines 33, 34, and 36 may be high pressure discharge lines, for instance. Moreover, there may be any desired number of distribution locations 40, 42. For example, in some embodiments, multiple discharge lines may be connected to the same distribution location. Alternatively, as illustrated in FIG. 1, each discharge line 30, 32, 34, 36 may be configured to connect to a respective distribution location 40, 42. Additionally, in further embodiments, there may be any desired number of discharge lines 30, 32, 34, 36 connected to the same distribution location 40, 42. Discharge lines 30, 32, 34, and 36 may include any number of valves 64, 65, 66, 67, 68, 69 located at any point along the discharge lines. Valves 64, 65, 66, 67, 68, 69 may be configured to substantially allow or substantially prevent fluid flow through discharge lines 30, 32, 34, and 36.

Distribution locations 40, 42 may be any location known to those skilled in the art where dispensing of fluid from fluid tank 12 may be desired. For example, in an embodiment where the fluid from fluid tank 12 is a cryogenic fuel, distribution locations 40, 42 may be usage sites including, but not limited to, a vaporization system, a system configured to be powered by the cryogenic fuel, and a truck or trailer configured to receive the cryogenic fuel and transport it to an alternate location.

Figure 2:
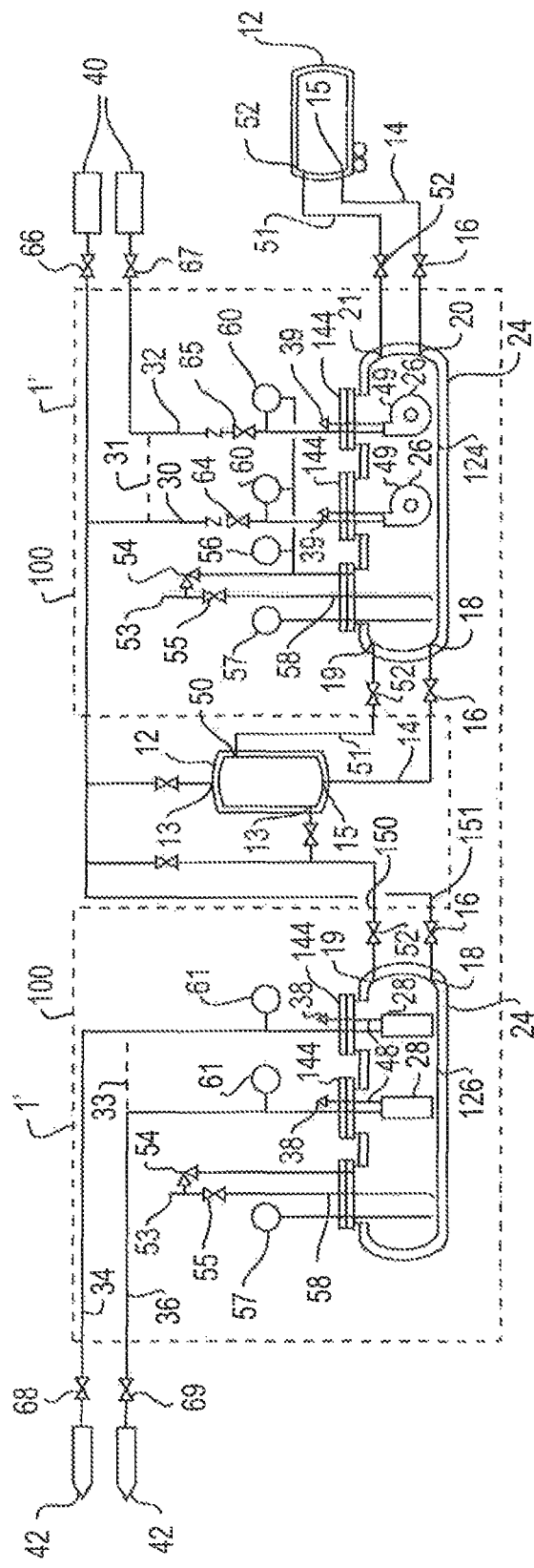
FIG. 2 illustrates a multiple pump system, according to a second embodiment of the present disclosure.

FIG. 2 illustrates a multiple pump system 100 according to a second embodiment of the present disclosure. Multiple pump system 100 may include multiple features that are similar to those disclosed in relation to the embodiment of FIG. 1. For example, multiple pump system 100 may include fluid tank 12 having at least one inlet 13 and at least one outlet 15. Fluid tank 12 may further be operatively connected to a multiple pump system 100. Multiple pump system 100 may include a first pump vessel 124 connected to fluid tank 12 via conduit 14. In addition, multiple pump system 100 may include a second pump vessel 126 connected to discharge lines 30, 32 of the one of more first pumps 26 via pump vessel inlet conduit 150 and the inlet of fluid tank 12 via pump vessel return conduit 151. Similar to conduit 14 connecting the first pump vessel 124 and fluid tank 12, conduit 151 may include a valve 16. Similar to conduit 51 connecting fluid tank 12 to first pump vessel 124, conduit 151 may include valve 52. Each respective valve 16, 52 may be configured to manually or automatically transition between an open configuration and a closed configuration.

Moreover, each of first pump vessel 124 and second pump vessel 126 may include multiple features that are similar to insulated vessel 24 in the embodiment of FIG. 1. Furthermore, each of first pump vessel 124 and second pump vessel 126 may include at least one inlet 18 and one outlet 19 configured to receive fluid from fluid tank 12 or the first pump 26 discharge lines. Moreover, one or more inlets 18 or outlets 19 may be configured for insertion and/or removal of measuring devices and/or maintenance devices, and/or to drain fluid in emergency and non-emergency situations. Similar to multiple pump vessel 24 in the embodiment of FIG. 1, each of first pump vessel 124 and second pump vessel 126 may also include at least one sensor and/or at least one indicator configured for measuring conditions within and around the respective pump vessel 124, 126 and provide audio and/or visual signals to a device operator and/or an automated control device.

FIG. 2 illustrates that first pump vessel 124 may include one or ore first pumps 26 located therein, and second pump vessel 126 may include one or more second pumps 28 located therein. Each of first pump and second pump vessels 124, 126 may include any desired number of first pumps 26 and second pumps 28 respectively. In one embodiment, first pump and second pump vessels 124, 126 may include at least two first pumps 26 and at least two second pumps 28, respectively. In one embodiment, first and second pump vessels 124, 126 may include at least two low pressure pumps 26 and at least two high pressure pumps 28, respectively. In another embodiment, first pumps 26 and second pumps 28 may be located in the same first pump vessel. For instance, first pump vessel 124 or second pump vessel 126 may include zero pumps, and first and second pumps 26 and 24 may be located in the same pump vessel. In some embodiments, first and second pumps 26, 24 may include the same type of pump.

The plurality of first and second pumps 26, 28 may be the same pumps as those discussed in relation to the embodiment of FIG. 1. For example, the plurality of first and second pumps 26, 28 may be any suitable pumps known to those skilled in the art, including, but not limited to, positive displacement pumps such as gear pumps, plunger pumps, piston pumps, and centrifugal pumps. In addition, the plurality of first pumps 26 may be configured to dispense the fluid from fluid tank 12 at a first pressure, and the plurality of second pumps 28 may be configured to dispense the fluid from fluid tank 12 at a second pressure. The first and second pressures may be different from one another. Similar to the embodiment of FIG. 1, the plurality of first pumps 26 may be configured to dispense the fluid in a pressure range of about 150-250 psi, and the plurality of second pumps 28 may be configured to dispense the fluid in a pressure range of about 4000-5000 psi.

In addition, each of the plurality of first pumps 26 may be driven by a respective first power source 39, and each of the plurality of second pumps 28 may be driven by a respective second power source 38. As previously discussed in relation to the embodiment of FIG. 1, first and second power sources 39, 38 may be any suitable power source known to those skilled in the art including, but not limited to, electric, pneumatic, and hydraulic motors. Moreover, each first and second power source 39, 38 may be located within or exterior to each first and second pump vessel 124, 126, respectively. In the embodiment of FIG. 2, for example, each first power source 39 may be located within first pump vessel 124, and each second power source 38 may be located exterior to second pump vessel 126.

Each first power source 39 and each second power source 38 may further be configured to output power at different power levels to the plurality of first and second pumps 26, 28, respectively. For example, in the embodiment of FIG. 2, each first power source 39 may be configured to output power in a range of 20-30 hp to each respective first pump 26, and each second power source 38 may be configured to output power in a range of 30-200 hp to each respective second pump 28.

Each of the plurality of first pumps 26 and the plurality of second pumps 28 may further be connected to a respective discharge line 30, 32, 34, 36. As previously discussed, each discharge line 30, 32, 34, 36 may also be connected to a distribution location 40, 42, such that fluid may be dispensed through a discharge line 30, 32, 34, 36 to a desired distribution location 40, 42. Discharge lines 30, 32, 34, 36 may also include any number of valves 64, 65, 66, 67, 68, 69 capable of open and closed configurations to substantially prevent or allow fluid flow through the discharge lines and to distribution location 40, 42. FIG. 2 further illustrates that each discharge line 30, 32, 34, 36 may be configured to extend through an opening 144 located in an exterior surface of respective first pump vessel 124 and second pump vessel 126.

Openings 144 may include features that are similar to openings 44 in multiple pump vessel 24 of the embodiment of FIG. 1. For example, openings 144, 138 may be against an outer surface of their respective pump vessel 124, 126. Alternatively, as illustrated in FIG. 2, openings 144 may include hollow structures extending from the outer surface of first and second pump vessels 124, 126, respectively. In addition, each opening 144 may include any suitable size, shape, and/or configuration such that it may enable insertion and removal of a respective at least one first pump 26 and at least one second pump 28 therethrough.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A multiple pump system, comprising: a multiple pump vessel; a first pump configured to dispense a fluid out of the multiple pump vessel; a first discharge line having a first end configured to operatively connect to the first pump and a second end located exterior to the multiple pump vessel; a second pump configured to dispense the fluid out of the multiple pump vessel; and a second discharge line having a first end configured to operatively connect to the second pump and a second end located exterior to the multiple pump vessel, wherein the first discharge line and the second discharge line are not connected to each other; wherein the first pump and the second pump are partially submerged within the fluid in the multiple pump vessel, and wherein the first pump is configured to dispense the fluid out of the multiple pump vessel at a different pressure than the second pump.

2. The system of claim 1, further comprising a first power source configured to provide power to the first pump and a second power source configured to provide power to the second pump.

3. The system of claim 2, wherein the first power source is configured to operate the first pump at a first power level, wherein the second power source is configured to operate the second pump at a second power level, and wherein the first power level is different from the second power level.

4. The system of claim 3, wherein the first power level is in a range of 20-30 hp, and wherein the second power level is in a range of 30-200 hp.

5. The system of claim 2, wherein the first power source is located within the multiple pump vessel, and wherein the second power source is located exterior to the multiple pump vessel.

6. The system of claim 2, wherein the second power source is a hydraulic motor.

7. The system of claim 1, wherein the fluid is a cryogenic fluid, and wherein the first pump and the second pump are configured to dispense the cryogenic fluid.

8. The system of claim 7, wherein the cryogenic fluid is liquefied natural gas.

9. The system of claim 1, wherein the first pump is configured to dispense liquefied natural gas and the second pump is configured to dispense compressed natural gas.

10. The system of claim 1, comprising a plurality of first pumps and a plurality of second pumps.

11. The system of claim 1, wherein the first pump and the second pump are fully submerged within the fluid in the multiple pump vessel.

12. The system of claim 1, wherein the first pump is a centrifugal pump and the second pump is a piston pump.

13. The system of claim 1, wherein the second end of the first discharge line is configured to operatively connect to a first distribution location, and the second end of the second discharge line is configured to operatively connect to a second distribution location.

14. A multiple pump system, comprising: a fluid tank; a multiple pump vessel connected to the fluid tank to receive a fluid from the fluid tank, wherein the multiple pump vessel includes a first pump and a second pump located therein; a first discharge line having a first end configured to operatively connect to the first pump and a second end located exterior to the multiple pump vessel; and a second discharge line having a first end configured to operatively connect to the second pump and a second end located exterior to the multiple pump vessel; wherein the first pump is configured to dispense the fluid out of the multiple pump vessel via the first discharge line at a first pressure, wherein the second pump is configured to dispense the fluid out of the multiple pump vessel via the second discharge line at a second pressure; wherein the first pressure is different than the second pressure, such that the first pump is configured to dispense liquefied natural gas and the second pump is configured to dispense compressed natural gas; and wherein the first discharge line and the second discharge line are not connected to each other.

15. The system of claim 14, further comprising a first power source configured to provide power to the first pump and a second power source configured to provide power to the second pump.

16. The system of claim 15, wherein the first power source is configured to operate the first pump at a first power level, wherein the second power source is configured to operate second pump at a second power level, and wherein the first power level is different from the second power level.

17. The system of claim 15, wherein the second power source is a hydraulic motor located exterior to the multiple pump vessel.

18. The system of claim 14, wherein the first pump and the second pump are partially submerged within the fluid in the multiple pump vessel.

19. The system of claim 18, wherein the first pump and the second pump are fully submerged within the fluid in the multiple pump vessel.

20. The system of claim 14, comprising a plurality of first pumps and a plurality of second pumps.

21. The system of claim 14, wherein the first pressure is in a range of 150-250 psi, and wherein the second pressure is in a range of 4,000-5,000 psi.

22. A multiple pump system, comprising: a fluid tank; a first pump vessel connected to the fluid tank to receive a fluid from the fluid tank, wherein the first pump vessel includes a plurality of first pumps located therein; and a second pump vessel connected to the fluid tank to receive the fluid from the fluid tank, wherein the second pump vessel includes a plurality of second pumps located therein; wherein the plurality of first pumps are configured to dispense the fluid out of the first pump vessel via a plurality of first discharge lines operatively connected to the plurality of first pumps, wherein the first discharge lines extend out of the first pump vessel and do not reenter the first pump vessel, and wherein the plurality of first pumps dispense the fluid at a first pressure; wherein the plurality of second pumps are configured to dispense the fluid out of the second pump vessel via a plurality of second discharge lines operatively connected to the plurality of second pumps, wherein the second discharge lines extend out of the second pump vessel and do not reenter the second pump vessel, and wherein the plurality of second pumps dispense the fluid at a second pressure, and wherein the first pressure is different from the second pressure; and wherein the plurality of first discharge lines are not connected to the plurality of second discharge lines.

23. The multiple pump system of claim 22, wherein the plurality of first pumps includes the same type of pump and wherein the plurality of second pumps includes the same type of pump.

24. A multiple pump system, comprising: a multiple pump vessel; a first pump configured to dispense a fluid out of the multiple pump vessel; a first discharge line configured to operatively connect to the first pump, wherein the first discharge line extends out of the multiple pump vessel and does not reenter the multiple pump vessel; a second pump configured to dispense the fluid out of the multiple pump vessel; and a second discharge line configured to operatively connect to the second pump, wherein the second discharge line extends out of the multiple pump vessel and does not reenter the multiple pump vessel; wherein the first pump and the second pump are partially submerged within the fluid in the multiple pump vessel, and wherein the first pump is configured to dispense the fluid out of the multiple pump vessel at a different pressure than the second pump; and wherein the first discharge line and the second discharge line are not connected to each other.

* * * * *